Figure 1:
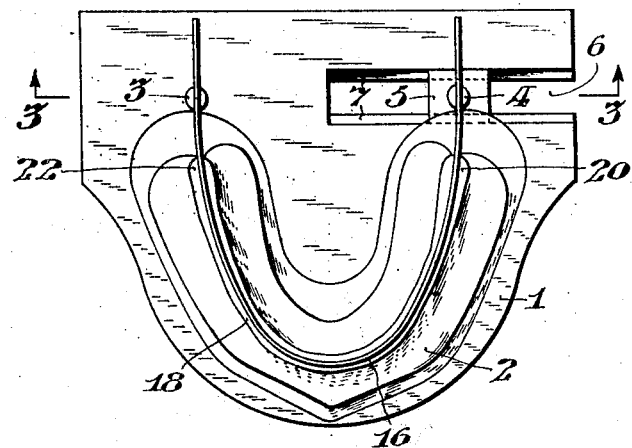

July 20, 1926.

F. G. HAWKSWORTH

DENTURE MEASURING DEVICE

Filed Dec. 4, 1920

Inventor
Frank G. Hawksworth,

Witness
Elsie J. Lukens

By
Clifton C. Callowell
Attorney

Patented July 20, 1926.

1,593,257

UNITED STATES PATENT OFFICE.

FRANK G. HAWKSWORTH, OF WESTMONT, NEW JERSEY, ASSIGNOR TO THE S. S. WHITE DENTAL MANUFACTURING COMPANY, A CORPORATION OF PENNSYLVANIA.

DENTURE-MEASURING DEVICE.

Application filed December 4, 1920. Serial No. 428,194.

When an artificial denture is required it is common practise to take an impression of the mouth of the patient and from such impression to mold a master model which is a duplicate in form of the gums of the mouth. From this model measurements are taken to ascertain the length of the gum ridge, and determine the size of the teeth required. In taking such measurements it is difficult for the operator to hold the measuring scale in proper relation to the denture model and at the same time register said scale accurately with the contour of the crest of the dental arch ridge.

My invention relates particularly to a device for measuring the length of the dental arch, and is especially directed to means for supporting a graduated scale in such relation to a dental arch model that the length of the ridge of a dental arch may be accurately determined.

The principal objects of my invention are to provide a device upon which the master model of a dental arch may be conveniently supported while being measured to ascertain the size of the teeth required, and to provide means for supporting a measuring scale over the model in proper relation to the crest of the dental arch ridge thereof, whereby the length of said ridge may be accurately determined.

Other objects of my invention are to provide a dental arch model holder with means for supporting a measuring scale in proper relation to the ridge of the dental arch, and to provide such an adjustment of the scale-supporting means that the end portions of the scale may be so relatively adjusted toward and from each other as to be spaced in accordance with the distance between the respective heels of the dental arch ridge.

My invention further includes a dental arch measuring device having means for supporting a scale in such relation to a master model of the dental arch as to facilitate the convenient adjustment of said scale in a direction perpendicular to the plane of occlusion of the model being measured, and also longitudinally with respect to the dental arch ridge formed thereon.

Specifically stated, the form of my invention as hereinafter described, comprises a supporting base having posts or standards provided with slots arranged to receive the end portions of a flexible measuring scale which may be held with its intermediate portion bowed to conform to the crest of the ridge of a dental arch model supported upon said base, said standards being adjustable toward and from each other to vary the distance between the end portions of said scale, whereby the radius of the bowed intermediate portion may be varied in accordance with the curvature or contour of the dental arch ridge being measured.

My invention also includes all of the various novel features of construction and arrangement as hereinafter more definitely specified.

Figure 2:
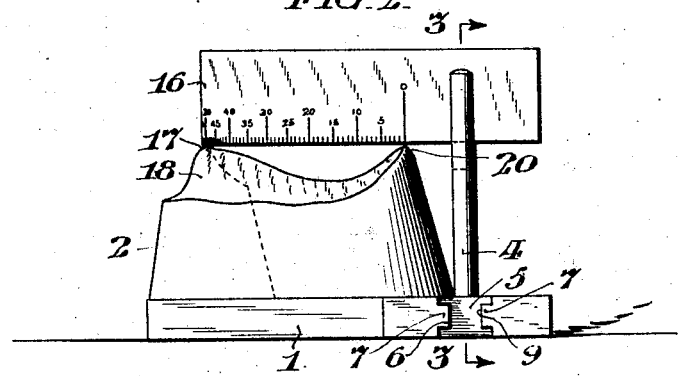
Figure 3:
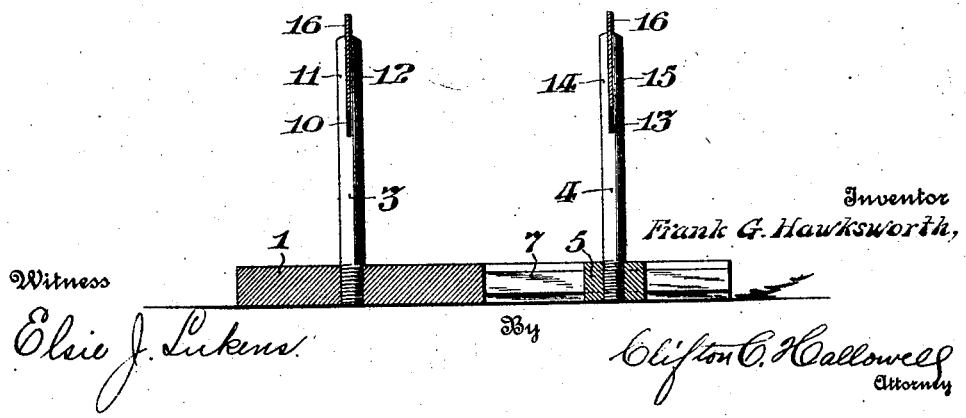

In the accompanying drawings, Figure 1 is a plan view of a measuring device constructed in accordance with my invention, showing a master model of a dental arch conveniently supported thereon; Fig. 2 is a side elevational view of the structure shown in Fig. 1; and Fig. 3 is a transverse vertical sectional view of said measuring device taken on the line 3—3 in Figs. 1 and 2.

In said figures, the base 1 which is of a form suitable for supporting the model 2 of the dental arch, is provided with the posts or standards 3 and 4, the standard 3 being preferably secured in fixed relation to the base 1, while the post 4 is carried by the slide-block 5. The slide-block 5 is arranged to slide in the slide-way 6 which is provided with the opposed longitudinal ribs 7 fitted into corresponding grooves 9 in the side walls of the slide-block 5, whereby said slide-block may be readily adjusted with its standard 4 toward and from the standard 3.

The standard 3 is provided with the axially disposed slot 10 forming the prongs 11 and 12, and the standard 4 is provided with a similar slot 13, forming the prongs 14 and 15, into which the end portions of a flexible graduated measuring scale 16 may be slipped and thereby frictionally held in position to cause its intermediate portion to conform to the crest 17 of the dental arch ridge 18 formed on the denture model 2.

It will be obvious that the scale 16 may be adjusted vertically in the slots 10 and 13 of the respective standards 3 and 4 into close proximity with the crest 17 of the dental arch ridge 18, irrespective of the thickness of the denture model, and that it may be longitudinally adjusted in said slots to register the zero graduation with one heel 20 of the dental arch model. Thus it will be seen that the graduation which registers with the opposite heel 22 on the dental arch model will indicate the accurate length of the dental arch ridge, whereby the requisite size of the teeth to be placed in the arch may be determined with absolute precision.

It may be here noted that although I have shown and described a base having one standard in fixed relation therewith and the other standard adjustably movable therein, both of said standards might as readily be movable with respect to each other, or might be otherwise adjustable, and, therefore, I do not desire to limit my invention to the precise details of construction and arrangement as herein set forth, as it is obvious that various modifications may be made therein without departing from the essential features of my invention as defined in the appended claims.

Having thus described my invention, I claim:—

1. A device of the character described comprising a base for supporting an article to be measured, and standards arranged on said base to engage the end portions of a measuring scale and support it with its free intermediate portion spaced from said base and bowed to conform to said article while supported on said base.

2. A device of the character described comprising a base for supporting a denture model, and standards arranged on said base and adapted to hold a measuring scale in operative relation to the ridge of the dental arch formed on said model, said standards being relatively adjustable toward and from each other while supported on said base.

3. A device of the character described comprising a base for supporting a denture model, standards arranged on said base and adapted to hold a measuring scale in operative relation to the ridge of the dental arch formed on said model, and a slide block movable in said base and arranged to carry one of said standards while supported on said base.

4. A device of the character described comprising a base for supporting a denture model, standards arranged on said base and adapted to hold a measuring scale in operative relation to the ridge of the dental arch formed on said model, and means whereby the distance between said standards may be varied while supported on said base.

5. A device of the character described comprising a base for supporting a denture model, and standards arranged on said base and adapted to hold a measuring scale in position to conform to the ridge of the dental arch formed on said model, and adjustable means for effecting the relative movement of said standards towards and from each other while supported on said base, without changing the parallel relation of the slots in said standards.

In witness whereof, I have hereunto set my hand this 2nd day of December, A. D., 1920.

FRANK G. HAWKSWORTH.